United States Patent

Deoka

Patent Number: 5,959,799
Date of Patent: Sep. 28, 1999

[54] METHOD AND APPARATUS FOR TRACKING CONTROL BY CHECKING TIMING BETWEEN A ROTARY HEAD REFERENCE POSITION AND AN ONSET OF REPRODUCING TRACKING INFORMATION RECORDED IN EACH TRACK

[75] Inventor: Yoshihiko Deoka, Tokyo, Japan

[73] Assignee: Sony Corporation, Tokyo, Japan

[21] Appl. No.: 08/580,517

[22] Filed: Dec. 28, 1995

[30] Foreign Application Priority Data

Dec. 29, 1994 [JP] Japan .................................. 6-340235

[51] Int. Cl.$^6$ ............................ G11B 21/04; G11B 5/584
[52] U.S. Cl. ..................... 360/70; 360/73.08; 360/73.11; 360/77.13
[58] Field of Search ............................. 360/73.04, 73.05, 360/73.08, 73.11, 73.12, 73.14, 70, 75, 77.13, 77.14, 77.15

[56] References Cited

U.S. PATENT DOCUMENTS

| 3,931,639 | 1/1976 | Arter et al. ................................ 360/70 |
| 3,964,094 | 6/1976 | Hart ...................................... 360/70 X |
| 4,951,162 | 8/1990 | Yoshimura et al. ............. 360/73.11 X |

FOREIGN PATENT DOCUMENTS

| 307586 | 10/1982 | European Pat. Off. . |
| 356959 | 8/1989 | European Pat. Off. . |
| 432540A2 | 11/1990 | European Pat. Off. . |
| 0671735 | 2/1995 | European Pat. Off. ...... G11B 15/467 |
| 63167477 | 12/1986 | Japan .............................. G11B 20/10 |
| 02024874 | 7/1988 | Japan .............................. G11B 20/10 |
| 03203853 | 12/1989 | Japan ........................... G11B 15/473 |
| 02065685 | 3/1990 | Japan ................................ H02P 5/00 |
| 2217051 | 4/1989 | United Kingdom ........... G05D 13/62 |
| 2137853 | 4/1994 | United Kingdom ............ G11B 27/10 |

OTHER PUBLICATIONS

Singapore Patent Office Search Report, Dec. 19, 1996.

*Primary Examiner*—Aristotelis M. Psitos
*Assistant Examiner*—Alan Faber
*Attorney, Agent, or Firm*—Jay H. Maioli

[57] ABSTRACT

A method and apparatus for tracking control of a magnetic head having information signals and tracking signals recorded on a plurality of slanted tracks measures a time duration from a time when a rotary head drum passes a reference position to a time when the head starts to reproduce the tracking signal. The measured time duration and a reference value are compared to determine whether the difference falls within a predescribed range and the relative speed between the transporting speed of the tape and the peripheral speed of the rotary head drum is controlled based on the comparison results when the determination results falls within the prescribed ranged. The reference value is continuously monitored and updated from a memory when the measured difference exceeds a predetermined value.

9 Claims, 5 Drawing Sheets

METHOD AND APPARATUS FOR TRACKING CONTROL BY CHECKING TIMING BETWEEN A ROTARY HEAD REFERENCE POSITION AND AN ONSET OF REPRODUCING TRACKING INFORMATION RECORDED IN EACH TRACK

BACKGROUND

1. Field of the Invention

The present invention relates to a controlling device for a tape-shaped recording medium and a tracking control method for a tape-shaped recording medium. More particularly, the present invention relates to a controlling device for controlling the relative speed of the transporting speed of a tape-shaped recording medium and the peripheral speed of a rotational drum.

2. Background of the Invention

Recording and/or recording apparatuses such as digital audio tape recorders and external storage devices for computers employing magnetic tape as a recording medium for storing audio data or computer data are well known. In such apparatus, a magnetic tape is wound helically or wrapped around the outer peripheral of the rotary drum to an angular extent of 90°. In this condition, the magnetic tape is transported and the rotary drum is rotationally driven. As a result, high density data is recorded on the magnetic tape by a head of the rotary drum in a helical scanning method.

Figure 1:
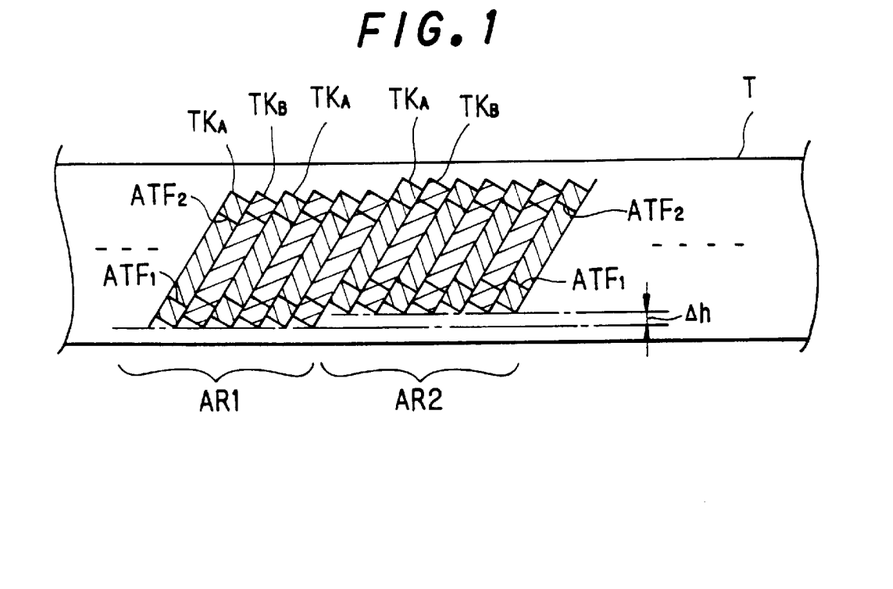
FIG. 1 is a view illustrating a change in the average height of tracks on the magnetic tape.

In this case, with the aid of the rotary drum, there are recorded on the magnetic tape T a plurality of tracks $TK_A, TK_B$ inclined relative to the proceeding direction of the magnetic tape T, as schematically shown in FIG. 1. In FIG. 1, alternate tracks $TK_A, TK_B$ are formed and recorded by magnetic heads A and B built in the rotary drum, respectively. These tracks $TK_A$, $TK_B$ have opposite azimuths. Information signals ATF1, ATF2 for use in an automatically tracking control (hereinafter referred to as ATF signals) are recorded in predetermined positions as ATF (Automatic Track Finding) areas of each track. These ATF signals are used as a tracking control which is utilized in the tracking operation to control a capstan motor and thus control the transportation speed of the magnetic tape T. In the conventional digital audio tape recorder, the tracking control is executed according to detection of these ATF signals.

In the other tracking control, which is used in the external storage device, there is used a signal recorded in a predetermined position of the track which is a sync signal such as a block sync signal. In the external storage device, a plurality of block data is recorded in the tracks. It is the block sync signal that is used for the tracking control which is positioned at the lower end position of the tracks. Hereinafter, the signal recorded in the predetermined position of the track is referred to as a TATF signal. During reproduction, the magnetic heads must accurately scan the tracks of the magnetic tape T. In the tracking control using the TATF signals, the time or period is measured from the time the magnetic head on the starting rotary drum is at a reference position at the magnetic head arrives to the time the pattern of the TATF signal, and the measured time is compared with a reference value. An error component is derived from the compared result become to a servo error information. The transportation speed of the magnetic tape T is controlled by controlling the rotational speed of the capstan motor which is transporting the magnetic tape according to the servo error information. In other words, the relative velocity between the rotational speed of the rotary drum and the transportation speed of the magnetic tape is controlled by the adjustment of the transportation speed of the magnetic tape so as to obtain desirable tracking conditions.

Figure 2A:
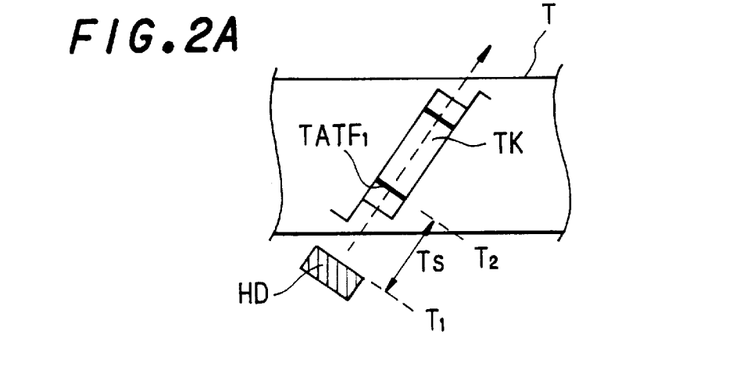
FIG. 2A is a view showing the relationship between the magnetic head and the tape tracks and FIG. 2B is a timing chart illustrating the tracking control operation.
Figure 2B:
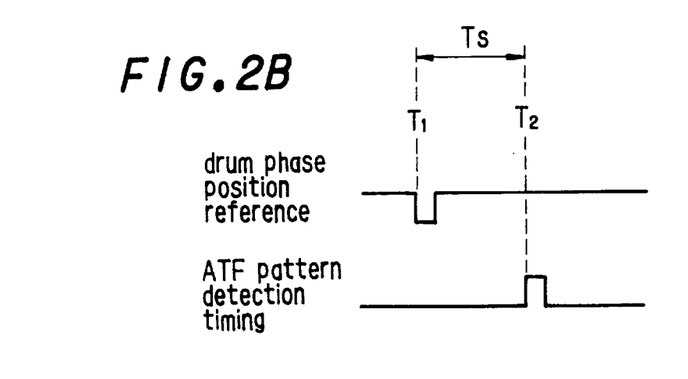

For example, as shown in FIG. 2A, the position of the rotary drum is taken to be the reference position when the magnetic head HD is in the position shown in FIG. 2A with respect to the track TK on the magnetic tape T. A time $T_1$ when the rotational drum is in the reference phase position may then be detected by, for example, adopting a construction where a pulse signal is generated from a pulse generator (PG) provided at a drum motor for rotationally driving the rotary drum, at the time when the rotating rotary drum is in the reference phase position. After this, the magnetic head HD comes into contact with the magnetic tape T, scans the track TK and detects the signal pattern for the TATF signal as the reproducing data, the timing of which is taken as the time $T_2$. The time necessary from the time $T_1$ to the time $T_2$ is taken as $T_S$, as shown in FIGS. 2A and 2B. The time necessary from when the rotary drum is in the reference phase position to when the signal pattern for the TATF signal is detected that is, the time for the magnetic head HD to obtain preferable tracking conditions with respect to the track TK so that the head is tracing the center of the track TK is measured and set-up beforehand as the reference value. Desirable tracking conditions are therefore obtained when the measured time $T_S$ coincides with the reference value. On the other hand, when the time $T_S$ and the reference value are compared and a difference exists, a tracking shift proportional to this difference is occurring. Servo control can then be executed so as to remove this difference by influencing the transportation speed of the magnetic tape. However, with the tape recording and/or reproducing apparatus described above, the position of the average height of the tracks formed on the magnetic tape changes for various reasons. In FIG. 1, conditions are shown where the position of the average height of the each of the tracks $TK_A$ and $TK_B$ on the magnetic tape T has changed by $\Delta h$ in regions AR1 and AR2. This may occur for various reasons such as temperature differences during recording, differences in mechanical conditions in discontinuous recording or recording using different equipment. For example, when the portion for the region AR2 is recorded by a different recorder after the portion for the region AR1 of FIG. 1 has been recorded, the position of the average height of the tracks often changes as shown in FIG. 1 due to the difference in mechanical conditions between the recorders. In the case where the magnetic tape with tracks shown in FIG. 1 is reproduced with a servo operation using a tracking control method, these changes cause extremely undesirable results. Namely, the time $T_S$, which is a time from when the rotational drum is in the reference phase position to when the signal pattern for the TATF signal is detected, changes significantly between the region AR1 and the region AR2. For example, when the reproduction is shifted to the region AR2 from the region AR1 for which desirable tracking control is being performed by comparing a certain reference value with the measured value $T_S$, the measured value $T_S$ will thereafter include the time corresponding to the variation $\Delta h$ in the height position as an error for the previous reference value. The tracking control is therefore then exerted toward out of control, by which the reproducing error rate is deteriorated and data correction and the reproduction become impossible. The above-mentioned tracking servo method is therefore extremely ineffective against variation in the position of the average track height. In the case of an apparatus for recording and/or reproducing computer data, when reproduction becomes impossible due to variation in the position of the average track height, the tape is rewound back to the point where the reproduction became impossible and a new reference value is measured, the tape is then rewound again and tracking control can be carried out using the new reference value. However, this considerably delays the reproducing operation. With devices that playback music data or moving image data, that is, an apparatus or devices that demand immediate reproduction, this kind of re-try operation cannot be carried out and the above kind of tracking control method may not be adopted.

SUMMARY OF THE INVENTION

It is therefore an object of the present invention to provide a tape-shaped recording medium controlling apparatus which resolves the above mentioned problem.

It is another object of the present invention to provide a tape-shaped recording medium tracking control method which resolves the above-mentioned problem.

According to the present invention, there is provided a controlling apparatus for a tape-shaped recording medium having information signals and information for controlling the transporting speed of the tape-shaped recording medium being recorded on a plurality of oblique tracks on the tape-shaped recording medium. The controlling apparatus includes a rotational drum, a tape transport mechanism and a controller. The rotational drum is provided with at least one head. The tape transport mechanism is for transporting the tape-shaped recording medium at a prescribed speed. The controller is for controlling the relative speed of the transporting speed of the tape-shaped recording medium by the tape transport mechanism and the peripheral speed of the rotational drum. The controller compares a value of measured time duration, which is from a time when the head passes a reference phase position of the head within one rotation of the rotational drum to a time when the head starts to reproduce information for controlling the transporting speed recorded on the tape-shaped recording medium, with a reference value, and controls the relative speed on the basis of the comparison results. The controller also determines whether or not a difference between the value of measured time duration, which is from the time when the head passes the reference phase position of the head within one rotation of the rotational drum to the time when the head starts to reproduce the information for controlling the transporting speed recorded on the tape-shaped recording medium, and the reference value falls within a prescribed range.

According to the present invention, there is provided a method of controlling tracking for a tape-shaped recording medium having information signals and information for carrying out tracking control of the tape-shaped recording medium being recorded on a plurality of oblique tracks on the tape-shaped recording medium. This method involves comparing a value of measured time duration, which is from a time when a head passes a reference phase position of a head within one rotation of a rotational drum provided with at least one head to a time when the head starts to reproduce information for carrying out tracking control recorded on the tape-shaped recording medium, with a reference value, determining whether or not the difference between the value of measured time duration, which is from the time when the head passes the reference phase position of the head within one rotation of the rotational drum to the time when the head starts to reproduce the information for carrying out tracking control recorded on the tape-shaped recording medium, and the reference value falls within a prescribed range and controlling the relative speed of the transporting speed of the tape-shaped recording medium and the peripheral speed of the rotational drum on the basis of the comparison results when the determined result falls within the prescribed range.

According to the present invention, there is provided a controlling apparatus for a tape-shaped recording medium, having information signals and information for carrying out tracking control of the tape-shaped recording medium being recorded on a plurality of slanted tracks on the tape-shaped recording medium. The controlling device includes a rotational drum, a tape transport mechanism and a controller. The rotational drum is provided with at least one head. A tape-shaped recording medium is wound around the rotational drum. The head records information signals and information for carrying out tracking control on the tape-shaped recording medium by the head and also reads out information signals and information for carrying out tracking control recorded on the tape-shaped recording medium. The tape transport mechanism is for transporting the tape-shaped recording medium at a prescribed speed. The controller is for controlling the relative speed of the transporting speed of the tape-shaped recording medium by the tape transport mechanism and the peripheral speed of the rotational drum. The controller compares a value of measured time duration, which is from a time when the head passes a reference phase position of the head within one rotation of the rotational drum to a time when the head starts to reproduce a signal for carrying out tracking control recorded on the tape-shaped recording medium, with a reference value, and controls the relative speed on the basis of the comparison results. The controller determines whether or not a difference between the value of measured time duration, which is from the time when the head passes the reference phase position of the head within one rotation of the rotational drum to the time when the head starts to reproduce information for carrying out tracking control recorded on the tape-shaped recording medium, and the reference value falls within a prescribed range, and further controls the relative speed on the basis of the comparison results when the determined result falls within the prescribed range.

BRIEF DESCRIPTION OF THE DRAWINGS

FIG. 2A and FIG. 2B are views illustrating a tracking control operation employing an information signal for tracking control, wherein

FIGS. 4A to 4F are timing charts illustrating the servo operation of the servo circuit of the recording and/or reproducing apparatus, wherein

FIG. 5A and FIG. 5B are views explaining the servo circuit operation, wherein

DESCRIPTION OF THE INVENTION

The following is a detailed description with reference to the drawings of a recording and/or reproducing apparatus for a tape-shaped recording medium for the present invention. The embodiment in the following is described with the example of a recording and/or reproducing apparatus taking a magnetic tape as the tape-shaped recording medium.

Figure 3:
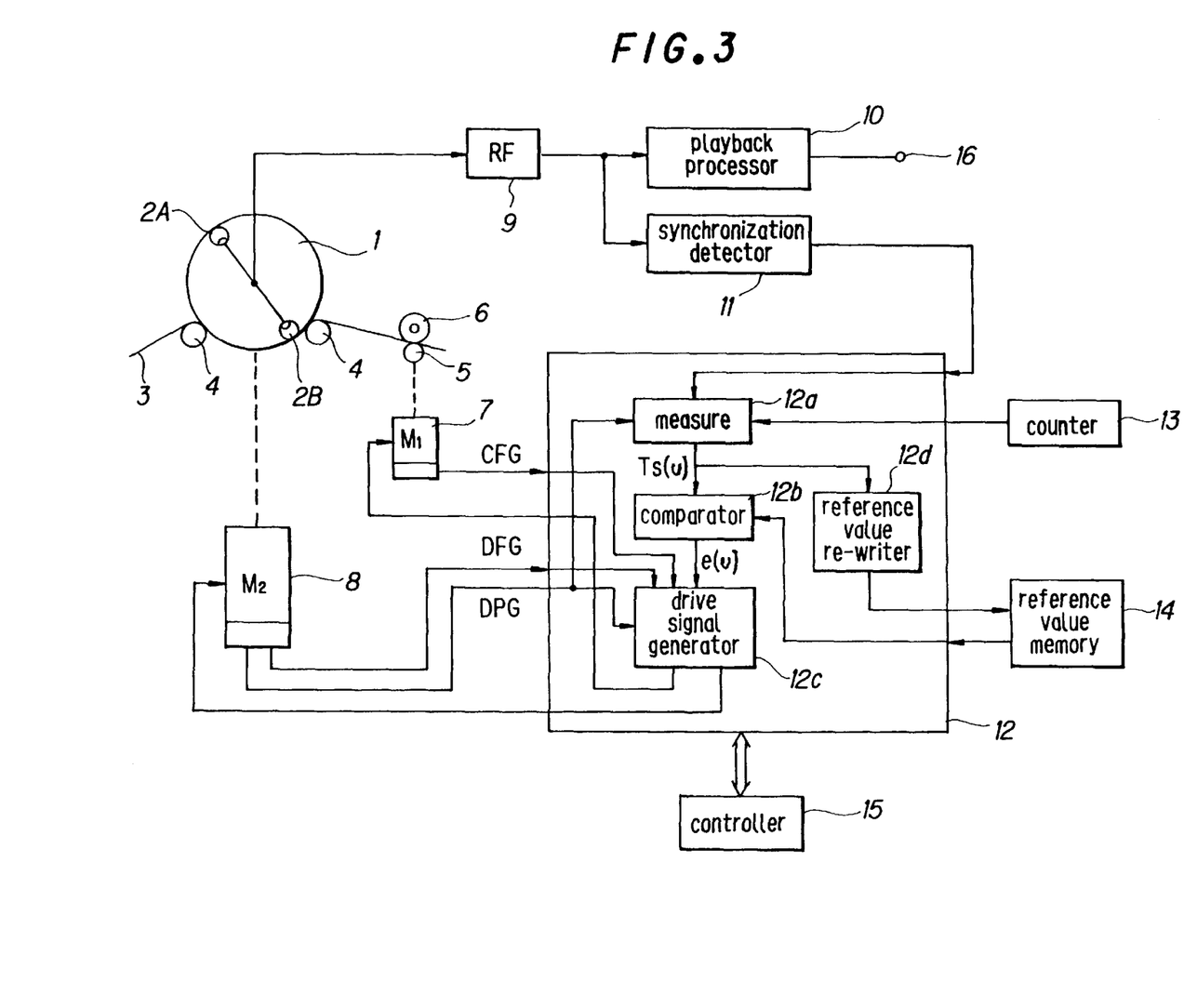
FIG. 3 is a block diagram showing the essential parts of the structure for a recording and/or reproducing apparatus of an embodiment of the present invention.

FIG. 3 is a schematic showing the structure of the essential parts of a recording and/or reproducing apparatus for recording digital data to and reproducing digital data from a magnetic tape. A rotational drum 1 is rotationally driven by a drum driving motor 8. On the drum 1, two magnetic heads 2A and 2B are provided positioned in such a manner as to be opposite each other at an angle of 180°.

A magnetic tape 3 is then pulled out from a tape cassette not shown in the drawing by a pair of loading pins 4 and wrapped around the outer periphery of the rotational drum 1 to an angular extent of 90°. The magnetic tape 3 has a plurality of inclined tracks, on which are recorded information signals such as digital data for a computer or the like. Each track is composed of a plurality of blocks which have a sync signal. In other words, the information signal is recorded on the track in the block unit. The block sync signal is for the TATF signal above-mentioned. The magnetic tape 3 is pressed against a capstan 5 by a pinch roller 6 and is transported at a speed corresponding to the rotations of the capstan 5 by the pinch roller 6 and the capstan 5. The capstan 5 is rotatably driven by a capstan motor 7.

Tracks of the magnetic tape 3 are alternately scanned by the magnetic heads 2A and 2B and thus read-out signals are supplied to an RF amplifier 9 through a rotary transformer not shown in the drawings. A signal outputted from the RF amplifier 9 is supplied to a reproducing processor 10. The reproducing processor 10 then performs prescribed demodulation, error correction and de-interleaving processes on the output signal from the RF amplifier 9 and supplies the output as reproducing data through an output terminal 16. The output signal of the RF amplifier 9 is also supplied to a synchronization detector 11 and a synchronization pattern within the track TATF signal is detected. A servo circuit 12 performs servo control for rotation of the capstan driving motor 7 and the drum driving motor 8.

The servo circuit 12 is composed of a measurer 12a, a comparator 12b, a drive signal generator 12c and a reference signal re-writer 12d, to be described later. At the servo circuit 12, a detection signal indicating that the synchronization pattern for the TATF signal from the synchronization detector 11 is inputted to the measurer 12a and a frequency signal CFG corresponding to the rotational velocity of the capstan motor is provided to the drum signal generator 12c from an FG (frequency generator) that is provided at the capstan driving motor 7. The frequency signal CFG is provided to the drive signal generator 12c and is used to control the capstan driving motor 7. A frequency signal DFG from an FG provided at the drum driving motor 8 and a reference phase position pulse DPG from a PG (pulse generator) are provided to the servo circuit 12. The pulse DPG is provided to the measurer 12a to be used in the generation of a measured value $T_{s(U)}$ to be described later. The frequency signal DFG is provided to the drive signal generator 12c and is used for controlling the driving of the drum driving motor 8. A counter 13 used for measuring time is constructed from, for example, a free-running counter, with the count value at each moment being provided to the servo circuit 12. A reference value memory 14 is comprised of a memory that is at least capable of being re-written with data such as an S-RAM or EEP-ROM, on which a reference value To for the capstan servo is recorded.

A controller 15 is composed of a microcomputer etc. and controls the operation of each of the parts of the recording and/or reproducing apparatus including the servo circuit 12.

Although the recording system circuit is not shown in FIG. 3, the servo circuit 12 performs a constant rotational speed servo operation based on the frequency signals CFG and DFG with regards to the drum driving motor 8 and the capstan diving motor 7 at the time of recording. With regards to the drum driving motor 8, the servo circuit 12 detects the rotational phase position of the rotational drum 1 from the reference phase position pulse DPG provided to the drive signal generator 12c and detects the rotational speed from the frequency signal DFG. The drive signal generator 12c of the servo circuit 12 compares the reference speed information and the rotational speed information to obtain speed error information. In response to this speed error information the rotational driving power as the driving signal is then adjusted and provided to the motor 8 to be driven at a constant velocity. The drive signal generator 12c also compares rotational speed information, which is obtained from the frequency signal CFG provided from the capstan driving motor 7, with the reference speed information to generate speed error information. The rotational driving power as the driving signal is then generated on the basis of the speed error information and is supplied to the capstan motor 7 which is thus driven at a constant rotational speed. The servo circuit 12 also performs a constant rotational speed servo for the drum driving motor 8 during the reproduction, while servo control including tracking adjustment is performed for the capstan driving motor 7.

Figure 4A:
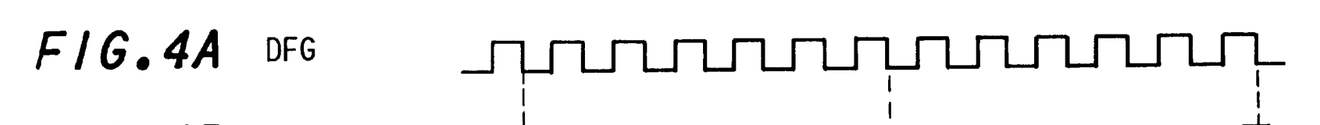
FIG. 4A is a waveform diagram showing a frequency signal DFG from a drum driving motor.
Figure 4B:
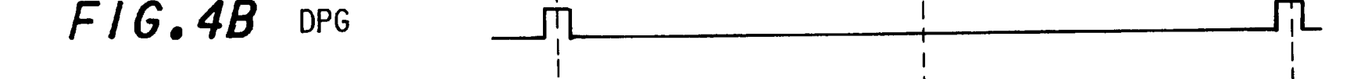
FIG. 4B is a waveform diagram showing a reference position phase pulse outputted from the drum driving motor.
Figure 4C:
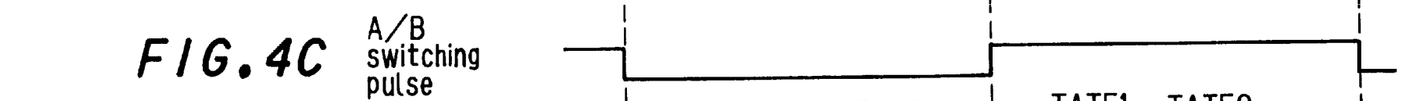
FIG. 4C is a waveform diagram showing a switching pulse for head changeover.
Figure 4D:
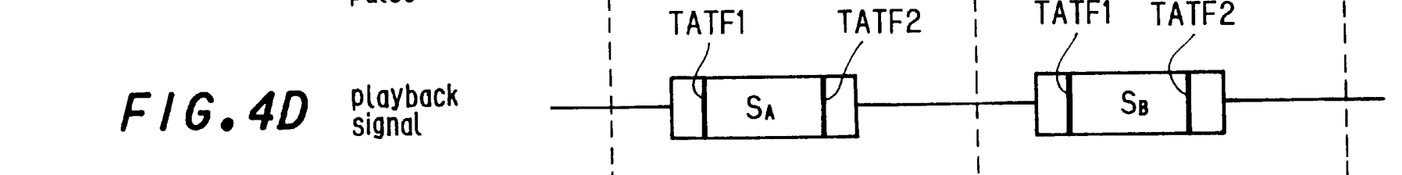
FIG. 4D is a waveform diagram showing a reproducing signal read-out by the head.
Figure 4E:
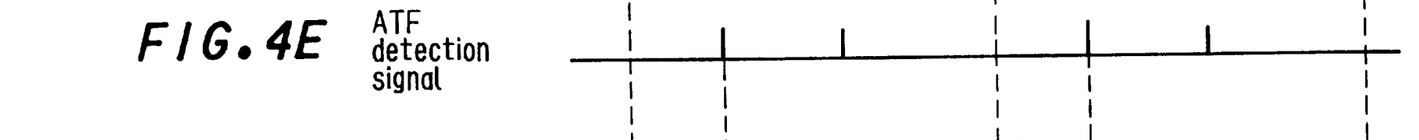
FIG. 4E is a waveform diagram showing a TATF signal and FIG. 4F is a waveform diagram showing a count value of a counter.
Figure 4F:
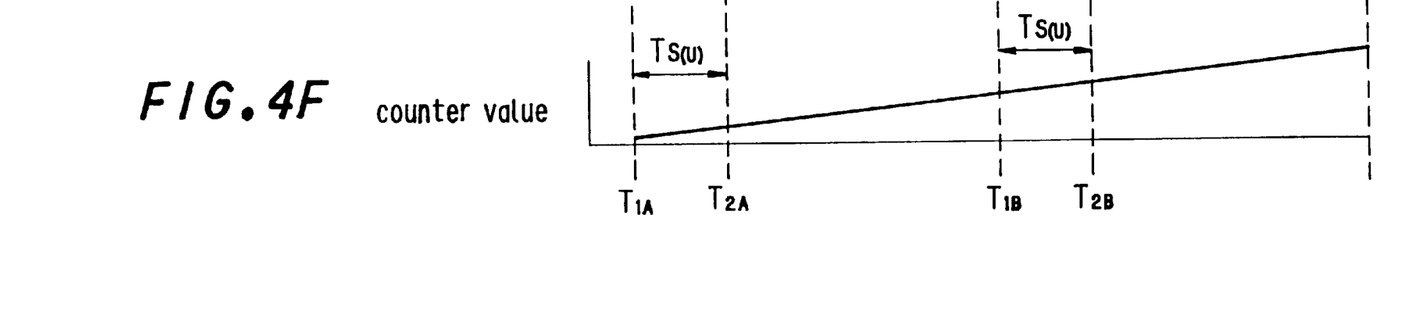

For the capstan driving motor 7, a tracking control operation is performed by using the TATF signal on the basis of the rotational speed (for example, 2000 rpm) of the drum driving motor 8 during the reproduction. This is briefly described using FIGS. 4A through 4F. FIG. 4A shows the frequency signal DFG from the drum driving motor 8, FIG. 4B shows the reference phase position pulse DPG from the drum driving motor 8, and FIG. 4C shows the switching pulse providing the changeover timing for the magnetic heads 2A and 2B. During reproduction, the track data $S_A$ of FIG. 4D is read as the reproducing data by the magnetic head 2A and track data $S_B$ is read as reproducing data by the magnetic head 2B. A synchronization pattern for the TATF signal is detected at the synchronization detector 11 for the track data $S_A$ and $S_B$, and the detected timing signal based on the TATF signal as shown in FIG. 4E is inputted to the measurer 12a of the servo circuit 12. FIG. 4F schematically shows the count value for the counter 13.

In the tracking control operation employing the TATF signal shown in FIGS. 2A and 2B, the time from the magnetic head being at a certain reference phase position at a certain point in time to the time when the TATF signal is read is measured and a servo error value is obtained by comparing this measured value with a reference value. Regarding the measuring operation of the measurer 12a, the count value of the counter 13 is read-in at the timing $T_{1A}$ of the reference phase position pulse DPG of FIG. 4B and the count value of the counter 13 is read-in at the timing $T_{2A}$ when the TATF detection signal of FIG. 4E is obtained. The measurer 12a then subtracts the count value for the timing $T_{2A}$ from the count value for the timing $T_{1A}$ and a measuring value $T_{s(U)}$ is generated. A reference value $T_0$ is measured beforehand as the value that the measured value $T_{s(U)}$ must have and this reference value $T_0$ is stored in the reference value memory 14. The measured value $T_{s(U)}$ obtained by the measurer 12a is then compared at the comparator 12b with the reference value $T_0$ read-out from the memory 14 and the resulting difference is then taken as error information. The output of the comparator 12b as the error information is provided to the drive signal generator 12c. At the drive signal generator 12c, the drive signal provided to the capstan driving motor 7 is corrected based on the output from the comparator 12b and the corrected drive signal is supplied to the capstan driving motor 7. As a result, the relative speed of the drum driving motor 8 and the capstan driving motor 7 can be adjusted so as to obtain good tracking conditions.

Figures 5A, 5B:
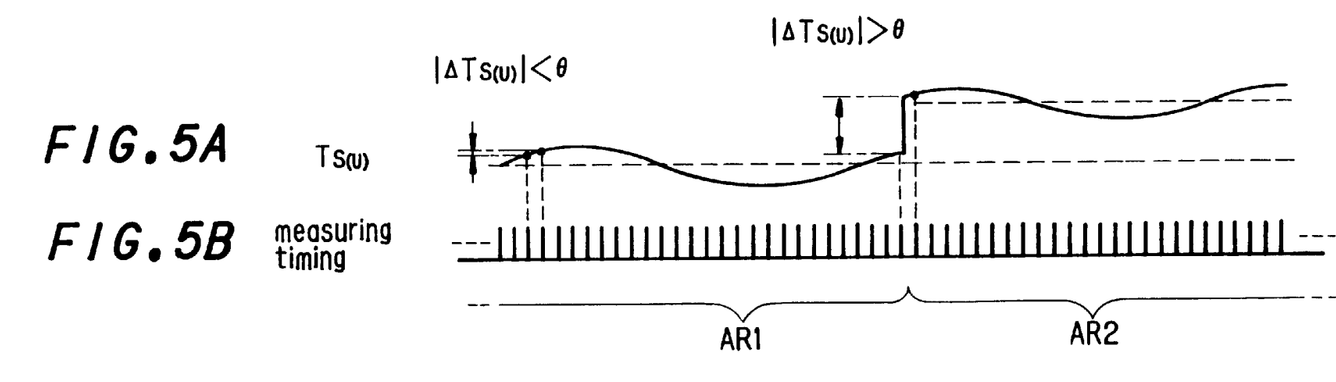
FIG. 5A is a waveform diagram showing changes in the measured value when the average height of the tracks changes and FIG. 5B is a waveform diagram showing the timing of the measuring operation for obtaining the measured value.

If the average height of the tracks varies as shown in FIG. 1, the servo operation in a tracking control method employing this kind of TATF signal cannot provide normal operation. In this embodiment, however, normal operation can be continued in accordance with these kind of height variations. In order to achieve this, the servo circuit 12 updates the reference value $T_0$ in accordance with an operation for detecting changes in the average height. The process is described using FIGS. 5A, 5B and 6. FIG. 5A shows a change in the measured value $T_{s(U)}$ when the average height of the tracks fluctuates in the regions AR1 and AR2 shown in FIG. 1. FIG. 5B shows the timing of the operation for measuring the measured value $T_{s(U)}$. For example, in considering only the region AR1, the measured value $T_{s(U)}$ fluctuates due to jitter of the rotational drum etc. in the way shown in FIG. 5A even when there are no fluctuations in the average height of the track. The operation for detecting changes in the average height of the tracks must therefore be carried out reliably so as to reject fluctuations due to jitter of the rotational drum. In this embodiment, changes in the average height of the tracks can therefore be detected while excluding fluctuations due to jitter of the rotational drum.

Figure 6:
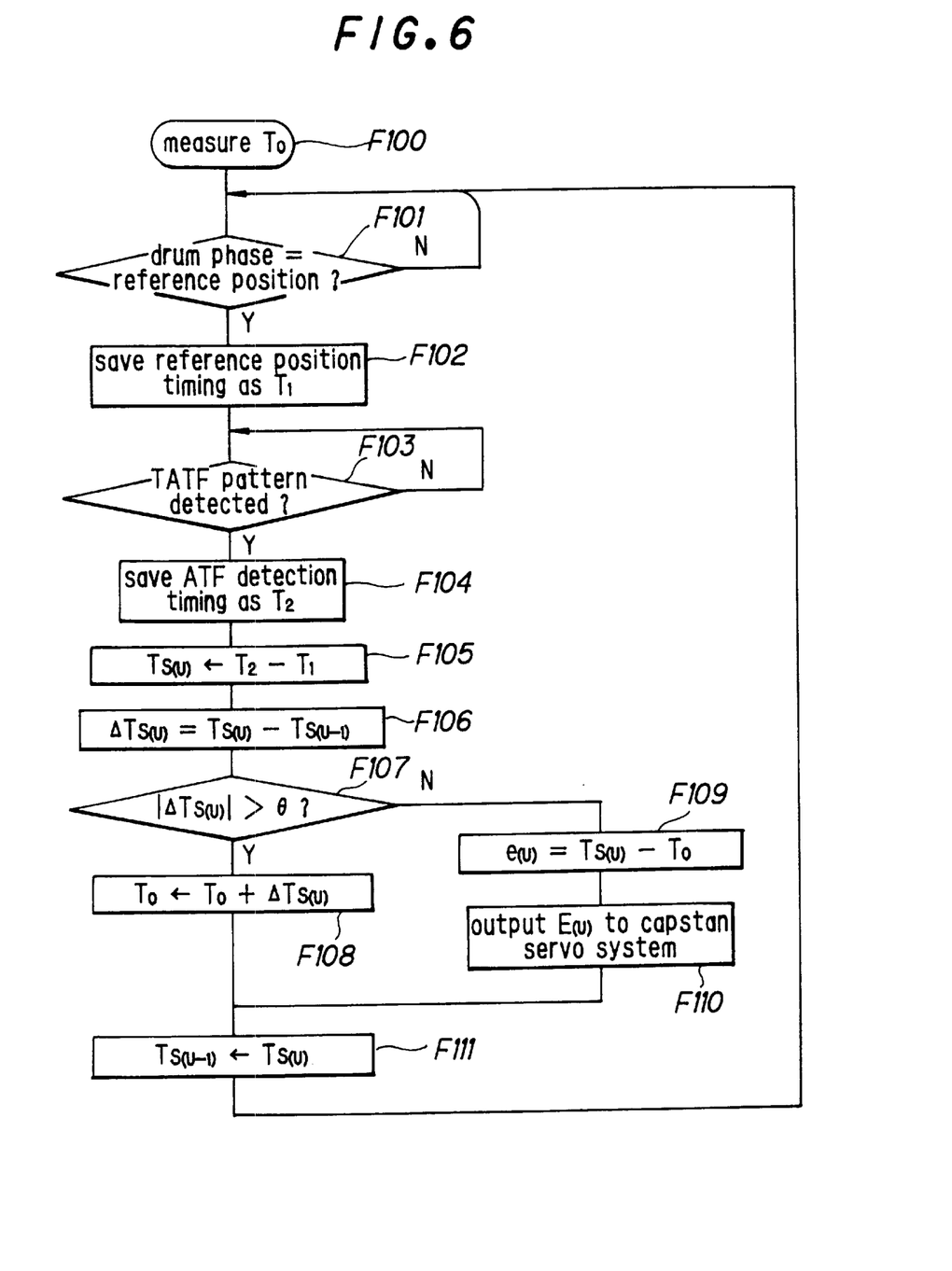
FIG. 6 is a flowchart showing a processing for the servo circuit.

In the flowchart in FIG. 6, step F100 shows the operation for measuring the reference value $T_0$ beforehand. Here, the measured reference value $T_0$ is stored in the reference value memory 14 and is used in an error value calculation during the reproduction. The process in step F101 onwards is proceeded with at the servo circuit 12 during the reproduction. First, an observation is made with the reference phase position pulse DPG to determine whether or not the rotational drum 1 has reached the reference phase position. This is carried out by a controller for the servo 12 that is not shown in the drawings or by the controller 15. When the rotational drum has reached the reference phase position, the value of the counter 13 at this time is read-in at the measurer 12a and held as the time $T_1$ (F102). The servo 12 then waits for the TATF detection signal to be provided from the synchronization detector 11 (F103). When a detection signal is provided from the synchronization detector 11, the value of the counter at this time is read-in and held as the time $T_2$ (F104). When the times $T_1$ and $T_2$ are read-in, the measurer 12a calculates $(T_2-T_1)$ and the result is outputted as the measurement value $T_{s(U)}$ (F105). The value measured previously $T_{s(U-1)}$ is then subtracted from the current measured value $T_{s(U)}$ at the reference value re-writer 12d and the difference is taken as the deviation $\Delta T_{s(U)}$ in the measured value (F106). The reference value re-writer 12d then compares the absolute value of the deviation $\Delta T_{s(U)}$ with a prescribed value $\theta$ (F107). The value $\theta$ is set to be a value greater than the sum of the fluctuation of the measured value $T_{s(U)}$ due to jitter of the rotating drum and the maximum credible value of variation of the measured value $T_{s(U)}$ due to the change in the height of track taken as the measuring target. That is, the prescribed value $\theta$ is taken as a threshold value for determining whether the deviation $\Delta T_{s(U)}$ is due to the influence of jitter of the rotational drum etc. or due to variation in the track height. For example, as shown by the measured values within the region AR1 in FIG. 5A, the absolute value of the deviation $\Delta T_{s(U)}$, that is, the difference due to the influence of jitter of the rotational drum etc. between the currently measured value $T_{s(U)}$ and the previously measured value $T_{s(U-1)}$, is comparatively small and is determined to be smaller than the prescribed value $\theta$.

On the other hand, with the boundary portion of the regions AR1 and AR2, that is, the case where the current measured value $T_{s(U)}$ is the value measured for the track for the region AR2 and the previously measured value $T_{s(U-1)}$ is the measured value for the track for the region AR1, and the average track height in the region AR1 changes in the region AR2 as shown in FIG. 1, the value for the deviation $\Delta T_{s(U-1)}$ becomes large as shown in FIG. 5A and the absolute value of the deviation $\Delta T_{s(U)}$ is determined to be larger than the prescribed value $\theta$. When it is determined by the reference value re-writer 12d in step F107 that the absolute value of the deviation $\Delta T_{s(U)}$ is smaller than the prescribed value $\theta$, then the average height of the tracks at this time is not changed, that is, a normal servo operation is being executed. The difference between the measured value $T_{s(U)}$ and the reference value $T_0$ is therefore output by at the comparator 12b as the servo error value e(u) (F109). This servo error value e(u) is provided to the drive signal generator 12c and a servo operation is executed for the capstan driving motor 7 (F110). The current measured value $T_{s(U)}$ is then held in the reference value re-writer 12d or a memory within the servo circuit 12 as the previous measured value $T_{s(U-1)}$ for the detection in next time (F111) and the process returns to step F101.

On the other hand, when it is determined by the reference value re-writer 12d that the absolute value of the deviation $\Delta T_{s(U)}$ is larger than the prescribed value $\theta$, it is determined that the average height of the tracks has changed at this time. In this case, a normal servo operation cannot be executed with the prior reference value $T_0$. A process of updating the reference value $T_0$ is therefore carried out in step F108 by the reference value re-writer 12d. In the updating process for the reference value re-writer 12d, the new reference value $T_0$ is taken to be the sum of the prior reference value $T_0$ and the deviation $\Delta T_{s(U)}$. As the new reference value $T_0$, for example, the current measured value $T_{s(U)}$ may be taken without modification. However, as in this embodiment, the adding of the deviation $\Delta T_{s(U)}$ to the prior reference value $T_0$ may be performed for minimizing influence of jitter. When a new value is calculated at the reference value rewriter 12d, then the value is written into the reference value memory 14.

After this, in the same way as before, the current measured value $T_{s(U)}$ is then held in the reference value re-writer 12d or a memory within the servo circuit 12 as the previous measured value $T_{s(U-1)}$ for the detection the next time (F111) and the process returns to step F101. After this, if the process proceeds to step F109, servo control is executed using the new reference value $T_0$. After the reference value $T_0$ has been updated, a more suitable reference value may be searched with the reproduction being continued. In the embodiment described above, even if the average height of the tracks can be found vary, the variation is detected to set-up a new reference value for being able to continue a servo operation employing a tracking control method using a TATF signal. There will therefore no abnormal tracking control employing a TATF signal that makes reproduction impossible and it will no longer be necessary re-wind the tape for performing a re-try operation in -the case that the reproduction is not possible. The present invention is, however, by no means limited to the above embodiments, and various modifications that remain within the scope of the present invention are possible.

In this embodiment, a TATF signal was detected for carrying out servo control, that is, tracking control operation. However, in the case that track formats have other specific patterns, other signals may be detected for measuring the timing and the similar servo operation may be carried out. The present invention may also be broadly applied to tape recording and/or reproducing apparatus using helical scanning methods such as digital data recording and/or reproducing apparatus, a digital audio data recording and/or reproducing apparatus and 8 millimeter video recorders etc.

What is claimed is:

1. A controlling apparatus for a tape-shaped recording medium having information signals and tracking information for controlling a transporting speed of the tape-shaped recording medium recorded on a plurality of slanted tracks on the tape-shaped recording medium, said controlling apparatus comprising:

a rotational drum provided with at least one head mounted on a peripheral area of said drum and including a pulse generator for producing a pulse signal;

tape transporting means for transporting the tape-shaped recording medium at a prescribed speed; and control means for controlling a relative speed between the transporting speed of the tape-shaped recording medium by said tape transporting means and a peripheral speed of said rotational drum, said control means including means for comparing a value of measured time duration from a time when said head passes a reference position within one rotation of said rotational drum to a time when said head starts to reproduce the tracking information with a reference value and for controlling the relative speed between the transporting speed of the tape-shaped recording medium and the peripheral speed of the rotational drum on the basis of a comparison result, and further including means for determining whether a difference between the value of the measured time duration from the reference position to the time when said head starts to reproduce the tracking information and the reference value falls within a prescribed range and reference value updating means for determining whether a difference between the value of measured time duration and the reference value falls within the prescribed range and for updating the reference value when a determination result exceeds the prescribed range, wherein said reference value updating means includes difference means for updating the reference value on the basis of a difference between a current value and a previous value of respective measured time durations from the time when said head passes the reference position to the time when said head starts to reproduce the tracking information.

2. A controlling apparatus for a tape-shaped recording medium having information signals and tracking information for controlling a transporting speed of the tape-shaped recording medium recorded on a plurality of slanted tracks on the tape-shaped recording medium, said controlling apparatus comprising:

a rotational drum provided with at least one head mounted on a peripheral area of said drum and including a pulse generator for producing a pulse signal;

tape transporting means for transporting the tape-shaped recording medium at a prescribed speed; and control means for controlling a relative speed between the transporting speed of the tape-shaped recording medium by said tape transporting means and a peripheral speed of said rotational drum, said control means including means for comparing a value of measured time duration from a time when said head Passes a reference position within one rotation of said rotational drum to a time when said head starts to reproduce the tracking information with a reference value and for controlling the relative speed between the transporting speed of the tape-shaped recording medium and the peripheral speed of the rotational drum on the basis of a comparison result, and further including means for determining whether a difference between the value of the measured time duration from the reference position to the time when said head starts to reproduce the tracking information and the reference value falls within a prescribed range and reference value updating means for determining whether a difference between the value of measured time duration and the reference value falls within the prescribed range and for updating the reference value when a determination result exceeds the prescribed range, and further comprising a reference value setting means for setting a new reference value by setting a value for the difference between the current measured value and the previous measured value to the reference value when said reference value updating means determines that the reference value can not be used for generating a servo control signal.

3. A controlling apparatus for a tape-shaped recording medium according to claim 2, further comprising storage means for storing the reference value which is updated by said reference value updating means on the basis of the determination result.

4. A method of controlling tracking in a rotary head apparatus having a head mounted on a peripheral area of a rotary drum for a tape-shaped recording medium having information signals and tracking information for controlling transporting speed of the tape-shaped recording medium recorded on a plurality of oblique tracks on the tape-shaped recording medium, said method comprising the steps of:

comparing a value of a measured time duration from a time when the head passes a reference position within one rotation of the rotary drum to a time when said head starts to reproduce the tracking information with a reference value;

determining whether a difference between the value of measured time duration and the reference value falls within a prescribed range;

controlling the relative transporting speed of the tape-shaped recording medium and a peripheral speed of said rotary drum on the basis of the comparison results when a result of the determining step falls within the prescribed range; and updating the reference value when the determined result falls outside the prescribed range, wherein the reference value is updated on the basis of a difference between a current value and a previous value of measured time durations from the time when said head passes the reference position to the time when said head starts to reproduce the tracking information.

5. A method of controlling tracking in a rotary head apparatus for a tape-shaped recording medium according to claim 4, further comprising steps of updating the reference value and controlling the relative speed on the basis of the updated reference value when the determined result falls outside the prescribed range.

6. A method of controlling tracking in a rotary head apparatus having a head mounted on a peripheral area of a rotary drum for a tape-shaped recording medium having information signals and tracking information for controlling transporting speed of the tape-shaped recording medium recorded on a plurality of oblique tracks on the tape-shaped recording medium, said method comprising the steps of:

comparing a value of a measured time duration from a time when the head passes a reference position within one rotation of the rotary drum to a time when said head starts to reproduce the tracking information with a reference value;

determining whether a difference between the value of measured time duration and the reference value falls within a prescribed range;

controlling the relative transporting speed of the tape-shaped recording medium and a peripheral speed of said rotary drum on the basis of the comparison results when a result of the determining step falls within the prescribed range; and     updating the reference value when the determined result falls outside the prescribed range, wherein the reference value is updated on the basis of a difference between a current value and a previous value of measured time durations from the time when said head passes the reference position to the time when the head starts to reproduce the tracking information.

7. A controlling apparatus for a tape-shaped recording medium having information signals and tracking information for controlling a transporting speed of the tape-shaped recording medium recorded thereon at a plurality of slanted tracks comprising:

a rotational drum provided with at least one head mounted on a peripheral area thereof and having the tape-shaped recording medium wound there around for recording information signals and tracking information for controlling transporting speed on the tape-shaped recording medium and reading out the information signals and the tracking information and including a pulse generator for producing a pulsed signal;

tape transporting means for transporting the tape-shaped recording medium at a prescribed speed; and     control means for controlling a relative speed between the transporting speed of the tape-shaped recording medium by said tape transporting means and a peripheral speed of said rotational drum, said control means including means for comparing a value of measured time duration from a time when said head passes a reference position of the head within one rotation of said rotational drum determined by said pulsed signal to the time when said head starts to reproduce the tracking information with a reference value for controlling the relative speed between the transporting speed of the tape-shaped recording medium and the peripheral speed of the rotational drum on the basis of comparison results and for determining whether a difference between the value of measured time duration and the reference value falls within a prescribed range, and further for controlling the relative speed between the transporting speed and the peripheral speed on the basis of the comparison results when the comparison results fall within the prescribed range,     wherein said control means comprises reference value updating means for determining whether a difference between the value of measured time duration and the reference value falls within the prescribed range and for updating the reference value when a determination result exceeds the prescribed range, and wherein said reference value updating means updates the reference value on the basis of a difference between a current value and a previous value of the measured time durations from the time when said head passes the reference position to the time when said head starts to reproduce the tracking information.

8. A controlling apparatus for a tape-shaped recording medium having information signals and tracking information for controlling a transporting speed of the tape-shaped recording medium recorded thereon at a plurality of slanted tracks comprising:

a rotational drum provided with at least one head mounted on a peripheral area thereof and having the tape-shaped recording medium wound there around for recording information signals and tracking information for controlling transporting speed on the tape-shaped recording medium and reading out the information signals and the tracking information and including a pulse generator for producing a pulsed signal;

tape transporting means for transporting the tape-shaped recording medium at a prescribed speed; and     control means for controlling a relative speed between the transporting speed of the tape-shaped recording medium by said tape transporting means and a peripheral speed of said rotational drum, said control means including means for comparing a value of measured time duration from a time when said head passes a reference position of the head within one rotation of said rotational drum determined by said pulsed signal to the time when said head starts to reproduce the tracking information with a reference value for controlling the relative speed between the transporting speed of the tape-shaped recording medium and the peripheral speed of the rotational drum on the basis of comparison results and for determining whether a difference between the value of measured time duration and the reference value falls within a prescribed range, and further for controlling the relative speed between the transporting speed and the peripheral speed on the basis of the comparison results when the comparison results fall within the prescribed range, and further comprising reference value setting means for setting a new reference value by adding the value for the difference between the current measured value and the previous measured value to the reference value when said control means determines that the reference value can not be used for generating a servo control signal.

9. A controlling apparatus for a tape-shaped recording medium having information signals and tracking information for controlling a transporting speed of the tape-shaped recording medium recorded thereon at a plurality of slanted tracks comprising:

a rotational drum provided with at least one head mounted on a peripheral area thereof and having the tape-shaped recording medium wound there around for recording information signals and tracking information for controlling transporting speed on the tape-shaped recording medium and reading out the information signals and the tracking information and including a pulse generator for producing a Pulsed signal;

tape transporting means for transporting the tape-shaped recording medium at a prescribed speed;

control means for controlling a relative speed between the transporting speed of the tape-shaped recording medium by said tape transporting means and a peripheral speed of said rotational drum, said control means including means for comparing a value of measured time duration from a time when said head passes a reference position of the head within one rotation of said rotational drum determined by said pulsed signal to the time when said head starts to reproduce the tracking information with a reference value for controlling the relative speed between the transporting speed of the tape-shaped recording medium and the peripheral speed of the rotational drum on the basis of comparison results and for determining whether a difference between the value of measured time duration and the reference value falls within a prescribed range, and further for controlling the relative speed between the transporting speed and the peripheral speed on the basis of the comparison results when the comparison results fall within the prescribed range;

reference value setting means for setting a new reference value by adding the value of the difference between the current measured value and the previous measured value to the reference value when said control means determines that the reference value can not be used for generating a servo control signal; and storage means for storing the reference value set by said reference value setting means on the basis of the determination results.

* * * * *